(12) United States Patent
Ishikawa et al.

(10) Patent No.: US 11,385,409 B2
(45) Date of Patent: Jul. 12, 2022

(54) CONNECTION STRUCTURE FOR OPTICAL WAVEGUIDE CHIP

(71) Applicant: Nippon Telegraph and Telephone Corporation, Tokyo (JP)

(72) Inventors: Hiroshi Ishikawa, Tokyo (JP); Kota Shikama, Tokyo (JP); Yuko Kawajiri, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 54 days.

(21) Appl. No.: 17/253,063

(22) PCT Filed: May 24, 2019

(86) PCT No.: PCT/JP2019/020665
§ 371 (c)(1),
(2) Date: Dec. 16, 2020

(87) PCT Pub. No.: WO2019/244560
PCT Pub. Date: Dec. 26, 2019

(65) Prior Publication Data
US 2021/0215879 A1 Jul. 15, 2021

(30) Foreign Application Priority Data

Jun. 22, 2018 (JP) .............................. JP2018-118623

(51) Int. Cl.
*G02B 6/26* (2006.01)
(52) U.S. Cl.
CPC ..................................... *G02B 6/26* (2013.01)

(58) Field of Classification Search
None
See application file for complete search history.

(56) References Cited

U.S. PATENT DOCUMENTS 6,470,118 B1    10/2002  Uno
6,826,324 B2 *  11/2004  Steinberg ............. G02B 6/3502
                                                              385/20

(Continued)

FOREIGN PATENT DOCUMENTS

JP      2001330762 A    11/2001
JP      2003188463 A     7/2003

(Continued)

OTHER PUBLICATIONS

H. Ishikawa, et al., "Pluggable Photonic Circuit Platform Using a Novel Passive Alignment Method," 22nd Microoptics Conference (MOC2017), Tokyo, Japan, Nov. 19-22, 2017, pp. 84-85.

*Primary Examiner* — Chad H Smith
(74) *Attorney, Agent, or Firm* — Slater Matsil, LLP

(57) ABSTRACT

A connection structure for optical waveguide chips includes a silica-based PLC in which grooves are formed, spacer steel balls fitted in the grooves, and silica-based PLCs in which grooves into which the spacer steel balls to be fitted are formed, the silica-based PLCs being mounted on the silica-based PLC by being supported by the spacer steel balls. A conductor wire formed in the silica-based PLC and a conductor wire formed in the silica-based PLC are electrically connected to each other by a conductor film formed in the groove, the spacer steel balls and a conductor film formed in the groove.

20 Claims, 14 Drawing Sheets

(56) References Cited

U.S. PATENT DOCUMENTS

| | | | |
|---|---|---|---|
| 8,548,287 B2 * | 10/2013 | Thacker | G02B 6/26 385/14 |
| 9,323,012 B1 * | 4/2016 | Sun | G02B 6/4224 |
| 9,470,855 B1 | 10/2016 | Shubin et al. | |
| 2003/0118262 A1 | 6/2003 | Aoki et al. | |
| 2005/0013557 A1 | 1/2005 | Lu | |
| 2016/0116687 A1 | 4/2016 | Sun et al. | |

FOREIGN PATENT DOCUMENTS

| | | |
|---|---|---|
| JP | 2003195369 A | 7/2003 |
| JP | 2017032950 A | 2/2017 |

* cited by examiner

CONNECTION STRUCTURE FOR OPTICAL WAVEGUIDE CHIP

CROSS-REFERENCE TO RELATED APPLICATIONS

This application is a national phase entry of PCT Application No. PCT/JP2019/020665, filed on May 24, 2019, which application claims the benefit of Japanese Application No. 2018-118623, filed Jun. 22, 2018, each of which is hereby incorporated herein by reference.

TECHNICAL FIELD

The present invention relates to a connection structure between optical waveguide chips used in technical fields that require processing of optical signals, such as optical communication or optical sensing.

BACKGROUND

Industrial fields that involve the optical signal processing technology such as optical communication or optical sensing are being rapidly developed along with related fields. The electronic circuit technology, which is being rapidly developed as with the optical signal processing technology, is often used in combination with the optical signal processing technology. Compared with the electronic circuit technology, the optical signal processing technology has some challenges: reduction in size and simplification of connection.

With the electronic circuit technology based on silicon, according to the scaling principle, the finer the circuit, the higher the performance of the circuit is. As a result, downscaling has energetically been sought. However, with the optical signal processing technology, the spatial optical system has a very large size. Even with the planar lightwave circuit (PLC) that can provide a smaller system than the spatial optical system, even waveguides, which are the most basic optical element, have sizes of the order of several μm to several hundreds of μm due to the cut-off condition, and the devices tend to have larger sizes than those in the electronic circuit technology.

As for the simplification of connection, in the electronic circuit technology, signals can be extremely easily transmitted in the low frequency range by simply connecting conductors such as metal. For the high frequency range, there are advanced pluggable connection technologies such as RF connectors. However, with the optical signal processing technology, a good connection cannot be achieved simply by connecting media that transmit optical signals. In order to achieve a good connection in the optical signal processing technology, devices have to be aligned with high precision. For example, devices having a single-mode waveguide need to be aligned with a precision of the order of sub-micrometer, depending on the material or design.

As an approach to achieve the reduction in size and the simplification of connection in the optical signal processing technology, a method is proposed in Patent Literature 1. The structure disclosed in Patent Literature 1 can provide a pluggable connection like a connector that can connect optical waveguide chips (silica-based PLCs) as required. Such a connection structure for optical waveguide chips will be referred to as a pluggable photonic circuit platform (PPCP), hereinafter.

FIGS. 9A to 9D are schematic diagrams showing a typical configuration of the PPCP. FIG. 9A is a perspective view of the PPCP, FIG. 9B is an exploded view of components of the PPCP, FIG. 9C is a diagram showing bonding faces of a silica-based PLC and a silica-based plate, and FIG. 9D is a cross-sectional view of the PPCP taken along an xy plane. In FIGS. 9A to 9D, the PPCP is formed by a combination of seven members, specifically, two silica-based PLCs 601 and 602, which are optical waveguide chips formed by a silica-based glass layer including a Si substrate and a waveguide layer, a silica-based PLC 603, which is also an optical waveguide chip, and four spacer optical fibers (spacer members) 606.

The PPCP shown in FIGS. 9A to 9D is configured to transmit input optical signals 605a and 605b through the silica-based PLCs 601 and 602 and provide output optical signals 604a and 604b. As shown in FIGS. 9A and 9B, the silica-based PLC 601 and the silica-based PLC 602 are arranged side by side with respective entrance and exit end faces 617 and 618 thereof being opposed to each other, and the two silica-based PLCs 601 and 602 are mounted on the silica-based PLC 603.

As shown in FIG. 9D, the silica-based PLC 601 includes a Si substrate 609 and an optical waveguide layer 608 formed thereon. The optical waveguide layer 608 includes a cladding layer 610 made of $SiO_2$ and a core 611 formed in the cladding layer 610. In the cladding layer 610, fitting grooves 607 are formed. The silica-based PLC 602 has the same structure as the silica-based PLC 601.

Similarly, the silica-based PLC 603 includes a Si substrate 612 and an optical waveguide layer 613 formed thereon. The optical waveguide layer 613 includes a cladding layer 615 made of $SiO_2$ and a core 616 formed in the cladding layer 615. In the cladding layer 615, fitting grooves 614 are formed at locations to be opposed to the fitting grooves 607 of the silica-based PLCs 601 and 602 when the silica-based PLCs 601 and 602 are mounted on the silica-based PLC 603. A conductor wire 619 is also formed in the silica-based PLC 603, and a metal spring 620 is electrically and mechanically connected to the conductor wire 619. The conductor wire 619 is connected to an electrical circuit (not shown) formed in the silica-based PLC 603.

On the other hand, in the silica-based PLC 601, a conductor wire 621 is formed at a location to be opposed to the metal spring 620 when the silica-based PLC 601 is mounted on the silica-based PLC 603. The conductor wire 621 is connected to an electrical circuit (not shown) formed in the silica-based PLC 601.

As shown in FIGS. 9B and 9C, the silica-based PLCs 601 and 602 are fixed to the silica-based PLC 603 by the spacer optical fibers 606 fitted into the fitting grooves 614 in the silica-based PLC 603 and the fitting grooves 607 in the silica-based PLCs 601 and 602. The conductor wire 621 formed in the silica-based PLC 601 and the conductor wire 619 formed in the silica-based PLC 603 are also electrically connected to each other by the metal spring 620.

The structure described above allows passive alignment of the silica-based PLCs 601 and 602. That is, the structure allows the silica-based PLCs 601 and 602 to be aligned with each other relying only on the mechanical precisions of the members and thereby allows simple connection with a precision of the order of sub-micrometer. At the same time, the structure allows integration of optical waveguides and thus reduction in size.

The implementation based on the PPCP technology realized as shown in FIGS. 9A to 9D is an optical coupling approach that has low connection loss and is achieved with inexpensive components. In addition, the approach does not require active alignment, which requires a dedicated device, and can be performed by both automatic mounting and manual mounting.

However, the approach shown in FIGS. 9A to 9D has a problem that it requires a structure for electrically connecting the lower silica-based PLC 603 and the upper silica-based PLCs 601 and 602 to each other in addition to the mechanical connection provided by the spacer members fitted in the fitting grooves 607 and 614 according to the PPCP technology. Although the structure for electrical connection is not explicitly shown in Patent Literature 1, the metal spring 620 serves as the structure for electrical connection in the approach shown in FIGS. 9A to 9D.

The conventional PPCP has a problem that a conductor such as the metal spring needs to be formed in a process substantially different from the PLC fabrication process and thus the implementation cost increases.

CITATION LIST

Patent Literature

Patent Literature 1: Japanese Patent Laid-Open No. 2017-32905

SUMMARY

Technical Problem

Embodiments of the present invention have been devised in view of the problem described above, and an object of embodiments of the present invention is to provide a connection structure for optical waveguide chips that can improve the implementation cost while maintaining the precision and ease of implementation of the implementation method.

Means for Solving the Problem

A connection structure for optical waveguide chips according to embodiments of the present invention includes: a base substrate in which a plurality of first grooves are formed; a plurality of spacer members fitted in the plurality of first grooves, respectively, in such a manner that a part thereof protrudes from the base substrate; and a plurality of optical waveguide chips including a substrate and an optical waveguide layer formed on the substrate, second grooves into which the protruding parts of the spacer members are to be fitted being formed in the optical waveguide layer at locations to be opposed to the first grooves, and the plurality of optical waveguide chips being mounted on the base substrate by being supported by the spacer members, the plurality of optical waveguide chips are mounted on the base substrate in such a manner that entrance and exit end faces of optical waveguide layers of adjacent two optical waveguide chips are opposed to each other, and a first conductor wire formed in the base substrate and a second conductor wire formed in at least one optical waveguide chip of the plurality of optical waveguide chips are electrically connected to each other by at least one spacer member having a conductivity of the plurality of spacer members.

A connection structure for optical waveguide chips according to embodiments of the present invention includes: a first optical waveguide chip including a first substrate and a first optical waveguide layer formed on the first substrate, a plurality of first grooves being formed in the first optical waveguide layer; a plurality of spacer members fitted in the plurality of first grooves, respectively, in such a manner that a part thereof protrudes from the first optical waveguide chip; and a second optical waveguide chip including a second substrate and a second optical waveguide layer formed on the second substrate, second grooves into which the protruding parts of the spacer members are to be fitted being formed in the second optical waveguide layer at locations to be opposed to the first grooves, and the plurality of second optical waveguide chips being mounted on the first optical waveguide chip by being supported by the spacer members, the plurality of second optical waveguide chips are mounted on the first optical waveguide chip in such a manner that entrance and exit end faces of second optical waveguide layers of adjacent two second optical waveguide chips are opposed to each other, and a first conductor wire formed in the first optical waveguide chip and a second conductor wire formed in at least one second optical waveguide chip of the plurality of second optical waveguide chips are electrically connected to each other by at least one spacer member having a conductivity of the plurality of spacer members.

In an example of the connection structure for optical waveguide chips according to embodiments of the present invention, the base substrate further includes a first conductor film electrically connected to the first conductor wire on an inner face of at least one of the first grooves into which the spacer member having a conductivity is fitted, and the optical waveguide chip further includes a second conductor film electrically connected to the second conductor wire on an inner face of a second groove that is opposed to the first groove in which the first conductor film is formed.

In an example of the connection structure for optical waveguide chips according to embodiments of the present invention, the first optical waveguide chip further includes a first conductor film electrically connected to the first conductor wire on an inner face of at least one of the first grooves into which the spacer member having a conductivity is fitted, and the second optical waveguide chip further includes a second conductor film electrically connected to the second conductor wire on an inner face of a second groove that is opposed to the first groove in which the first conductor film is formed.

In an example of the connection structure for optical waveguide chips according to embodiments of the present invention, the first conductor film is formed in all of the plurality of first grooves, and the second conductor film is formed in all of the plurality of second grooves.

In an example of the connection structure for optical waveguide chips according to embodiments of the present invention, the first conductor wire and the first conductor film have a same film structure, and the second conductor wire and the second conductor film have a same film structure.

In an example of the connection structure for optical waveguide chips according to embodiments of the present invention, the entire spacer member having a conductivity is made of a conductor, or a surface of the spacer member having a conductivity is made of a conductor.

In an example of the connection structure for optical waveguide chips according to embodiments of the present invention, all of the plurality of spacer members are spacer members that have a conductivity and have a same structure.

Effects of Embodiments of the Invention

According to embodiments of the present invention, the first conductor wire formed in the base substrate and the second conductor wire formed in at least one optical waveguide chip of the plurality of optical waveguide chips are electrically connected to each other by at least one spacer member having a conductivity of the plurality of spacer members. Therefore, the lower base substrate and the upper optical waveguide chip can be electrically connected to each other without using a three-dimensional connection structure other than the spacer members. As a result, according to embodiments of the present invention, the implementation cost can be improved while maintaining the precision and ease of implementation of the multichip implementation method based on passive alignment, which relies only on the mechanical precision for alignment.

According to embodiments of the present invention, the first conductor wire formed in the first optical waveguide chip and the second conductor wire formed in at least one second optical waveguide chip of the plurality of second optical waveguide chips are electrically connected to each other by at least one spacer member having a conductivity of the plurality of spacer members. Therefore, the lower first optical waveguide chip and the upper second optical waveguide chip can be electrically connected to each other without using a three-dimensional connection structure other than the spacer members. As a result, according to embodiments of the present invention, the implementation cost can be improved while maintaining the precision and ease of implementation of the multichip implementation method based on passive alignment, which relies only on the mechanical precision for alignment.

According to embodiments of the present invention, a first conductor film electrically connected to the first conductor wire is provided on an inner face of at least one of the first grooves into which the spacer member having a conductivity is fitted, and a second conductor film electrically connected to the second conductor wire is provided on an inner face of a second groove that is opposed to the first groove in which the first conductor film is formed. Therefore, the fitting of the spacer member into the first and second grooves and the electrical connection between the upper base substrate and the lower optical waveguide chip can be achieved at the same time. As a result, according to embodiments of the present invention, the electrical connection can be stabilized.

According to embodiments of the present invention, a first conductor film is formed in all of the plurality of first grooves, and a second conductor film is formed in all of the plurality of second grooves. Therefore, the electrical connection can be stabilized, and the physical stability of the upper optical waveguide chip and the lower base substrate or the physical stability of the first optical waveguide chip and the second optical waveguide chip can be improved.

According to embodiments of the present invention, the first conductor wire and the first conductor film have the same film structure, and the second conductor wire and the second conductor film have the same film structure. Therefore, the cost can be reduced.

According to embodiments of the present invention, all of the plurality of spacer members are spacer members that have a conductivity and have the same structure. Therefore, the physical stability of the upper optical waveguide chip and the lower base substrate or the physical stability of the first optical waveguide chip and the second optical waveguide chip can be improved.

DETAILED DESCRIPTION OF ILLUSTRATIVE EMBODIMENTS

First Embodiment

Figure 1A:
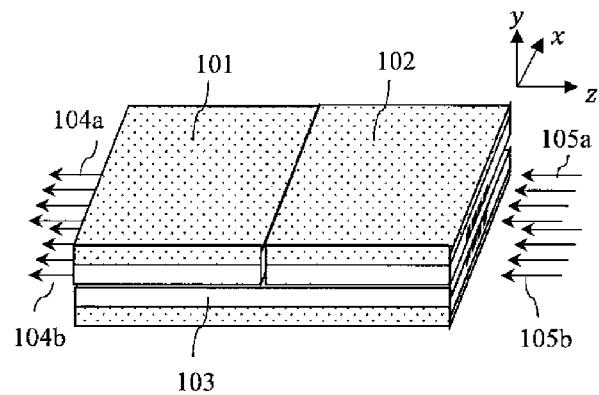
FIG. 1A is a schematic diagram showing a connection structure for optical waveguide chips according to a first embodiment of the present invention.
Figure 1B:
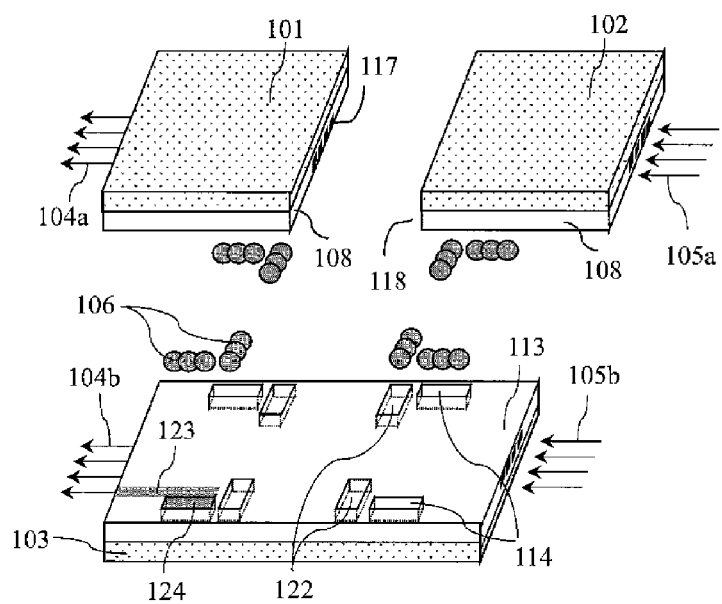
FIG. 1B is a schematic diagram showing the connection structure for optical waveguide chips according to the first embodiment of the present invention.
Figure 1C:
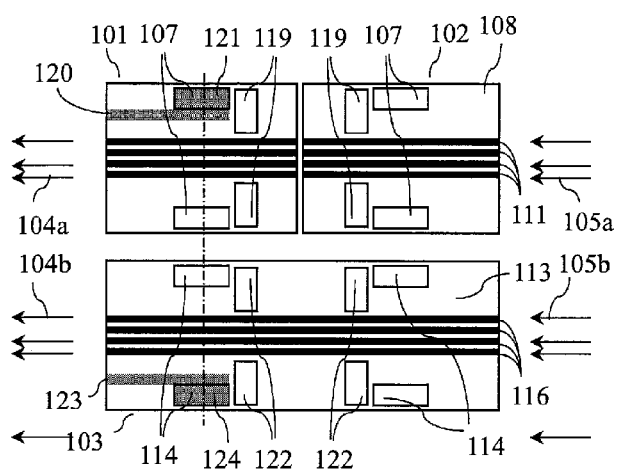
FIG. 1C is a schematic diagram showing the connection structure for optical waveguide chips according to the first embodiment of the present invention.
Figure 1D:
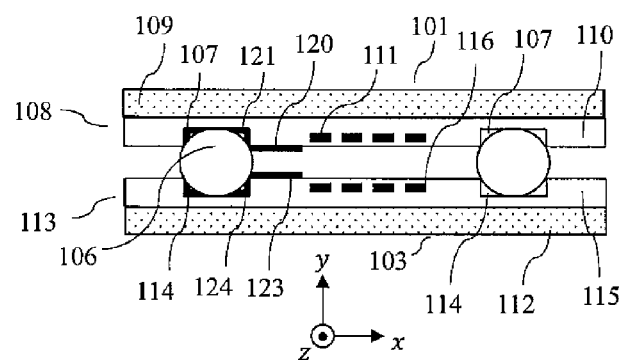
FIG. 1D is a schematic diagram showing the connection structure for optical waveguide chips according to the first embodiment of the present invention.

In the following, embodiments of the present invention will be described with reference to the drawings. FIGS. 1A to 1D are schematic diagrams showing a connection structure for optical waveguide chips according to a first embodiment of the present invention. FIG. 1A is a perspective view of the connection structure for the optical waveguide chips, FIG. 1B is an exploded view of components of the connection structure, FIG. 1C is a diagram showing bonding faces of the optical waveguide chips, and FIG. 1D is a cross-sectional view of the connection structure taken along an xy plane. In FIGS. 1A to 1D, a PPCP is formed by a combination of two silica-based PLCs 101 and 102, which are optical waveguide chips formed by a silica-based glass layer including a Si substrate and an optical waveguide layer, a silica-based PLC 103, which is also an optical waveguide chip, and a spacer steel ball (spacer member) 106.

As shown in FIG. 1A, an input optical signal 105a incident on the silica-based PLC 102 propagates through an optical waveguide layer of the silica-based PLC 102, exits the silica-based PLC 102, is incident on the silica-based PLC 101, propagates through an optical waveguide layer of the silica-based PLC 101 and then exits as an output optical signal 104a from the silica-based PLC 101. An input optical signal 105b incident on the silica-based PLC 103 propagates through an optical waveguide layer of the silica-based PLC 103 and exits the silica-based PLC 103 as an output optical signal 104b.

As shown in FIG. 1D, the silica-based PLC 101 includes a support substrate 109 made of Si and an optical waveguide layer 108 for transmitting an input optical signal formed on the support substrate 109. The optical waveguide layer 108 includes a cladding layer no made of SiO2 and a core 111 made of SiO2 doped with a dopant, for example, formed in the cladding layer no. In the cladding layer no, fitting grooves 107 and 119 are formed. The silica-based PLC 102 has the same structure as the silica-based PLC 101.

FIG. 1C shows bonding faces of the optical waveguide layers 108 (cladding layers no) of the silica-based PLCs 101 and 102 that are to be bonded to the silica-based PLC 103, and a bonding face of the optical waveguide layer (cladding layer) of the silica-based PLC 103 that is to be bonded to the silica-based PLCs 101 and 102. As shown in FIG. 1C, two fitting grooves 107 and two fitting grooves 119 are formed in one PLC. The fitting grooves 107 and 119 have the same depth.

Furthermore, in the cladding layer no of the silica-based PLC 101, a conductor wire 120 is formed. The conductor wire 120 is connected to an electrical circuit or the like (not shown) formed in the silica-based PLC 101. On an inner face of the fitting groove 107 of the two fitting grooves 107 of the silica-based PLC 101 that is closer to the conductor wire 120, a conductor film 121 is formed, and the conductor film 121 is electrically connected to the conductor wire 120. The conductor film 121 may be formed at the same time as the conductor wire 120 (that is, the conductor film 121 may have the same film structure as the conductor wire 120). Alternatively, the conductor film 121 may be formed to cover the inner face of the fitting groove 107 and a part of the conductor wire 120 in the vicinity of the fitting groove 107 after the conductor wire 120 is formed.

On the other hand, the silica-based PLC 103 includes a support substrate 112 made of Si and an optical waveguide layer 113 for transmitting the input optical signal 105b formed on the support substrate 112. The optical waveguide layer 113 includes a cladding layer 115 made of SiO2 and a core 116 made of SiO2 doped with a dopant, for example, formed in the cladding layer 115. In the cladding layer 115, fitting grooves 114 having the same shape as the fitting grooves 107 are formed at locations to be opposed to the fitting grooves 107 of the silica-based PLCs 101 and 102 when the silica-based PLCs 101 and 102 are mounted on the silica-based PLC 103. In the cladding layer 115, furthermore, fitting grooves 122 having the same shape as the fitting grooves 119 are formed at locations to be opposed to the fitting grooves 119 of the silica-based PLCs 101 and 102 when the silica-based PLCs 101 and 102 are mounted on the silica-based PLC 103.

FIG. 1C shows the bonding face of the cladding layer 115 to be bonded to the silica-based PLCs 101 and 102. Since the two fitting grooves 107 and the two fitting grooves 119 are formed in one PLC as described above, a total of four fitting grooves 114, that is, two fitting grooves 114 formed at locations to be opposed to the fitting grooves 107 of the silica-based PLC 101 and two fitting grooves 114 formed at locations to be opposed to the fitting grooves 107 of the silica-based PLCs 102, are formed in the cladding layer 115. Furthermore, a total of four fitting grooves 122, that is, two fitting grooves 122 formed at locations to be opposed to the fitting grooves 119 of the silica-based PLC 101 and two fitting grooves 122 formed at locations to be opposed to the fitting grooves 119 of the silica-based PLCs 102, are formed in the cladding layer 115. The fitting grooves 114 and 122 have the same depth.

In this embodiment, a longitudinal direction of the fitting grooves 107 and 114 is parallel to a z-axis direction (which is a direction of the optical axis of light exiting from the silica-based PLC 102 to the silica-based PLC 101, a direction of the optical axis of light incident on the silica-based PLC 101, or a direction from left to right in FIGS. 1A to 1C). A longitudinal direction of the fitting grooves 119 and 122 is perpendicular to the direction of the optical axis.

Furthermore, in the cladding layer 115 of the silica-based PLC 103, a conductor wire 123 is formed. The conductor wire 123 is connected to a pad, an electrical circuit or the like (not shown) formed in the silica-based PLC 103. On an inner face of the fitting groove 114 of the four fitting grooves 114 of the silica-based PLC 103 that is in the vicinity of the conductor wire 123, a conductor film 124 is formed, and the conductor film 124 is electrically connected to the conductor wire 123. Of the four fitting grooves 114, the fitting groove 114 in which the conductor film 124 is formed is the fitting groove 114 located to be opposed to the fitting groove 107 of the silica-based PLC 101 with the conductor film 121 formed therein when the silica-based PLC 101 is mounted on the silica-based PLC 103. The conductor film 124 may be formed at the same time as the conductor wire 123 (that is, the conductor film 124 may have the same film structure as the conductor wire 123). Alternatively, the conductor film 124 may be formed to cover the inner face of the fitting groove 114 and a part of the conductor wire 123 in the vicinity of the fitting groove 114 after the conductor wire 123 is formed.

The PPCP according to this embodiment is fabricated by fitting a spacer steel ball 106 having the same diameter in each of the four fitting grooves 114 and the four fitting grooves 122 formed in the silica-based PLC 103. In this embodiment, three spacer steel balls 106 are fitted in each of the fitting grooves 114 and 122.

As shown in FIG. 1B, with the bonding face of the optical waveguide layer 108 (cladding layer 110) of the silica-based PLC 101 being opposed to the bonding face of the optical waveguide layer 113 (cladding layer 115) of the silica-based PLC 103, that is, with the support substrate 109 being located at the top and the optical waveguide layer 108 being located at the bottom, the silica-based PLC 101 is mounted on the silica-based PLC 103 by fitting the spacer steel balls 106 fitted in the two fitting grooves 114 of the silica-based PLC 103 into the two fitting grooves 107 of the silica-based PLC 101 and the spacer steel balls 106 fitted in the two fitting grooves 122 of the silica-based PLC 103 into the two fitting grooves 119 of the silica-based PLC 101.

Similarly, with the bonding face of the optical waveguide layer 108 of the silica-based PLC 102 being opposed to the bonding face of the optical waveguide layer 113 of the silica-based PLC 103, the silica-based PLC 102 is mounted on the silica-based PLC 103 by fitting the spacer steel balls 106 fitted in the two fitting grooves 114 of the silica-based PLC 103 into the two fitting grooves 107 of the silica-based PLC 102 and the spacer steel balls 106 fitted in the two fitting grooves 122 of the silica-based PLC 103 into the two fitting grooves 119 of the silica-based PLC 102.

In this way, the silica-based PLCs 101 and 102 can be mounted on the silica-based PLC 103 in such a manner that an entrance and exit end face 117 of the silica-based PLC 101 and an entrance and exit end face 118 of the silica-based PLC 102 are opposed to each other at a close distance, and an optical connection between the silica-based PLC 101 and the silica-based PLC 102 can be established.

The fitting grooves 107, 114, 119 and 122 are formed by photolithography. Therefore, the width, the length and the position of the fitting grooves 107, 114, 119 and 122 can be determined with extremely high precision. Therefore, alignments in directions in the substrate plane of the optical waveguide layer 108 can be made with extremely high precision.

With the structure of the PPCP described above, the cores of the two silica-based PLCs 101 and 102 can be positioned with respect to the silica-based PLC 103 with high precision. When the silica-based PLCs 101 and 102 are mounted on the silica-based PLC 103, the cores 111 of the two silica-based PLCs 101 and 102 are positioned on the same straight line, and an optical connection with low loss can be provided. Thus, in this embodiment, passive alignment implementation without requiring input or output of light allows simple multichip implementation with a precision of a level of sub-micrometer, and also allows integration of PLCs 101 and 102 and thus reduction in size of the optical circuits.

Furthermore, in this embodiment, the conductor film 121 formed in the fitting groove 107 of the silica-based PLC 101 and the conductor film 124 formed in the fitting groove 114 of the silica-based PLC 103 are electrically connected to each other by the spacer steel balls 106 fitted in the fitting grooves 107 and 114, and as a result, the conductor wire 120 of the silica-based PLC 101 and the conductor wire 123 of the silica-based PLC 103 are also electrically connected to each other.

The conductor films 121 and 124 can be formed in exactly or substantially the same fabrication process as the conductor wires 120 and 123, and any three-dimensional structure such as a metal spring that requires a fabrication process substantially different from the fabrication process for the PLC does not have to be formed. As for the spacer steel balls 106, precise and inexpensive steel balls for ball bearings or ball point pens are available. Thus, the implementation cost can be reduced.

Second Embodiment

Figure 2A:
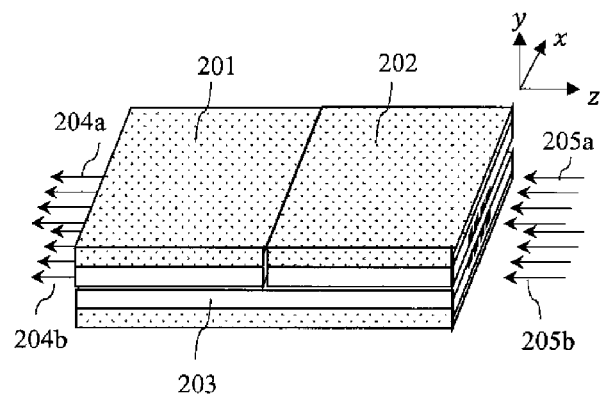
FIG. 2A is a schematic diagram showing a connection structure for optical waveguide chips according to a second embodiment of the present invention.
Figure 2B:
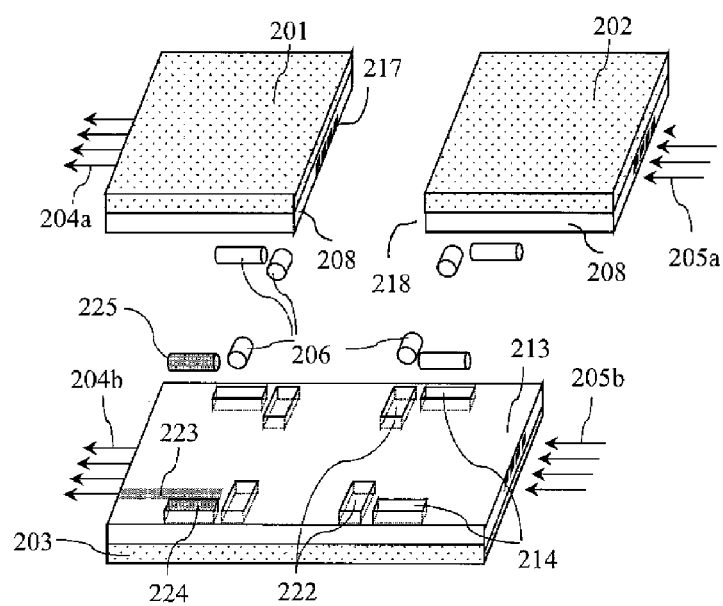
FIG. 2B is a schematic diagram showing the connection structure for optical waveguide chips according to the second embodiment of the present invention.
Figure 2C:
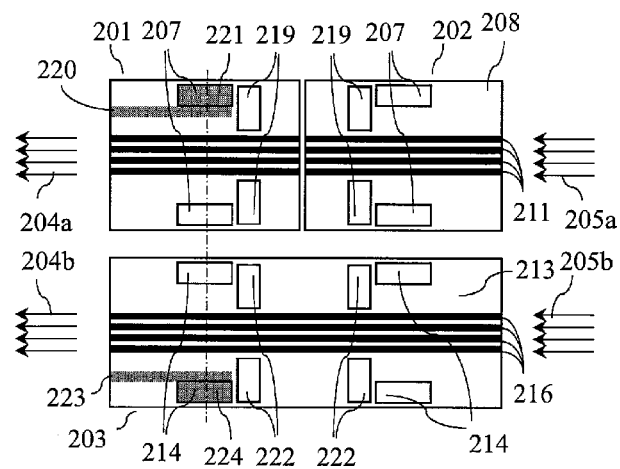
FIG. 2C is a schematic diagram showing the connection structure for optical waveguide chips according to the second embodiment of the present invention.
Figure 2D:
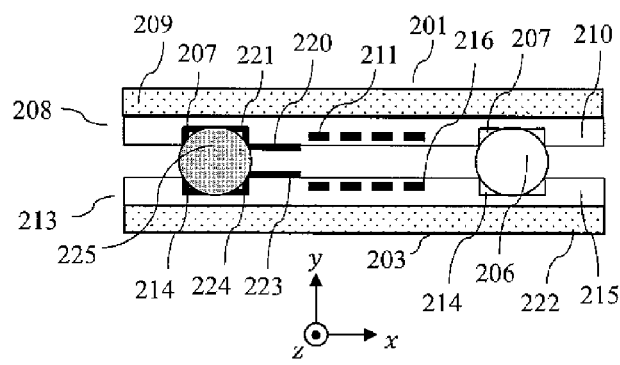
FIG. 2D is a schematic diagram showing the connection structure for optical waveguide chips according to the second embodiment of the present invention.

FIGS. 2A to 2D are schematic diagrams showing a connection structure for optical waveguide chips according to a second embodiment of the present invention. FIG. 2A is a perspective view of the connection structure for the optical waveguide chips, FIG. 2B is an exploded view of components of the connection structure, FIG. 2C is a diagram showing bonding faces of the optical waveguide chips, and FIG. 2D is a cross-sectional view of the connection structure taken along an xy plane.

As shown in FIG. 2A, an input optical signal 205a incident on a silica-based PLC 202 propagates through an optical waveguide layer of the silica-based PLC 202, exits the silica-based PLC 202, is incident on a silica-based PLC 201, propagates through an optical waveguide layer of the silica-based PLC 201 and then exits as an output optical signal 204a from the silica-based PLC 201. An input optical signal 205b incident on a silica-based PLC 203 propagates through an optical waveguide layer of the silica-based PLC 203 and exits the silica-based PLC 203 as an output optical signal 204b.

As with the silica-based PLC 101, the silica-based PLC 201 includes a support substrate 209 made of Si and an optical waveguide layer 208 for transmitting an input optical signal formed on the support substrate 209. As with the optical waveguide layer 108, the optical waveguide layer 208 includes a cladding layer 210 and a core 211. In the cladding layer 210, fitting grooves 207 and 219 similar to the fitting grooves 107 and 119 are formed. The silica-based PLC 202 has the same structure as the silica-based PLC 201.

FIG. 2C shows bonding faces of the optical waveguide layers 208 (cladding layers 210) of the silica-based PLCs 201 and 202 that are to be bonded to the silica-based PLC 203, and a bonding face of the optical waveguide layer (cladding layer) of the silica-based PLC 203 that is to be bonded to the silica-based PLCs 201 and 202.

In the cladding layer 210 of the silica-based PLC 201, a conductor wire 220 similar to the conductor wire 120 is formed. On an inner face of the fitting groove 207 of the two fitting grooves 207 of the silica-based PLC 201 that is closer to the conductor wire 220, a conductor film 221 is formed, and the conductor film 221 is electrically connected to the conductor wire 220.

On the other hand, as with the silica-based PLC 103, the silica-based PLC 203 includes a support substrate 212 made of Si and an optical waveguide layer 213 for transmitting the input optical signal 205b formed on the support substrate 212. As with the optical waveguide layer 113, the optical waveguide layer 213 includes a cladding layer 215 and a core 216. In the cladding layer 215, fitting grooves 214 similar to the fitting grooves 114 and fitting grooves 222 similar to the fitting grooves 122 are formed.

Furthermore, in the cladding layer 215 of the silica-based PLC 203, a conductor wire 223 similar to the conductor wire 123 is formed. On an inner face of the fitting groove 214 of the four fitting grooves 214 of the silica-based PLC 203 that is in the vicinity of the conductor wire 223, a conductor film 224 is formed, and the conductor film 224 is electrically connected to the conductor wire 223. As in the first embodiment, of the four fitting grooves 214, the fitting groove 214 in which the conductor film 224 is formed is the fitting groove 214 located to be opposed to the fitting groove 207 of the silica-based PLC 201 with the conductor film 221 formed therein when the silica-based PLC 201 is mounted on the silica-based PLC 203.

The PPCP according to this embodiment is fabricated by fitting a spacer optical fiber (spacer member) in each of the four fitting grooves 214 and the four fitting grooves 222 formed in the silica-based PLC 203. Spacer optical fibers 206 to be fitted in the seven fitting grooves 214 and 222 in which the conductor film 224 is not formed of the four fitting grooves 214 and the four fitting grooves 222 have the same diameter and are not coated with a conductor film, and a spacer optical fiber 225 to be fitted in the fitting groove 214 in which the conductor film 224 is formed is coated with a conductor film. The spacer optical fiber 225 is the spacer optical fiber 206 coated with a conductor film.

As shown in FIG. 2B, with the bonding face of the optical waveguide layer 208 (cladding layer 210) of the silica-based PLC 201 being opposed to the bonding face of the optical waveguide layer 213 (cladding layer 215) of the silica-based PLC 203, the silica-based PLC 201 is mounted on the silica-based PLC 203 by fitting the spacer optical fibers 206 and 225 fitted in the two fitting grooves 214 of the silica-based PLC 203 into the two fitting grooves 207 of the silica-based PLC 201 and the spacer optical fibers 206 fitted in the two fitting grooves 222 of the silica-based PLC 203 into the two fitting grooves 219 of the silica-based PLC 201.

Similarly, with the bonding face of the optical waveguide layer 208 of the silica-based PLC 202 being opposed to the bonding face of the optical waveguide layer 213 of the silica-based PLC 203, the silica-based PLC 202 is mounted on the silica-based PLC 203 by fitting the spacer optical fibers 206 fitted in the two fitting grooves 214 of the silica-based PLC 203 into the two fitting grooves 207 of the silica-based PLC 202 and the spacer optical fibers 206 fitted in the two fitting grooves 222 of the silica-based PLC 203 into the two fitting grooves 219 of the silica-based PLC 202.

In this way, as in the first embodiment, the silica-based PLCs 201 and 202 can be mounted on the silica-based PLC 203 in such a manner that an entrance and exit end face 217 of the silica-based PLC 201 and an entrance and exit end face 218 of the silica-based PLC 202 are opposed to each other at a close distance, and an optical connection between the silica-based PLC 201 and the silica-based PLC 202 can be established.

Furthermore, in this embodiment, the conductor film 221 formed in the fitting groove 207 of the silica-based PLC 201 and the conductor film 224 formed in the fitting groove 214 of the silica-based PLC 203 are electrically connected to each other by the spacer optical fiber 225 fitted in the fitting grooves 207 and 214. As a result, in this embodiment, the conductor wire 220 of the silica-based PLC 201 and the conductor wire 223 of the silica-based PLC 203 can be electrically connected to each other.

As in the first embodiment, the conductor films 221 and 224 can be formed in exactly or substantially the same fabrication process as the conductor wires 220 and 223, and any three-dimensional structure such as a metal spring does not have to be formed. As for the spacer optical fibers 206 that are not coated with a conductor film and the spacer optical fiber 225 that is coated with a conductor film, inexpensive optical fibers are available. Thus, the implementation cost can be reduced.

Third Embodiment

Figure 3A:
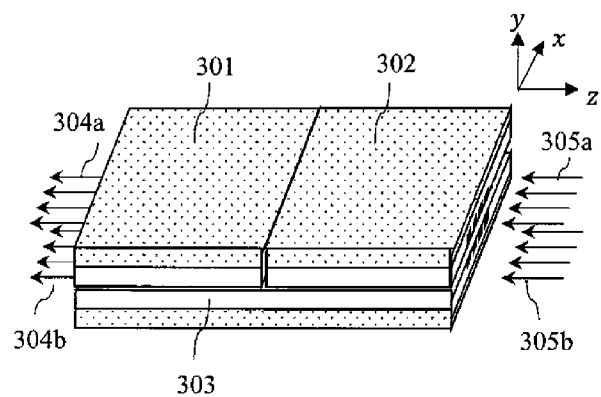
FIG. 3A is a schematic diagram showing a connection structure for optical waveguide chips according to a third embodiment of the present invention.
Figure 3B:
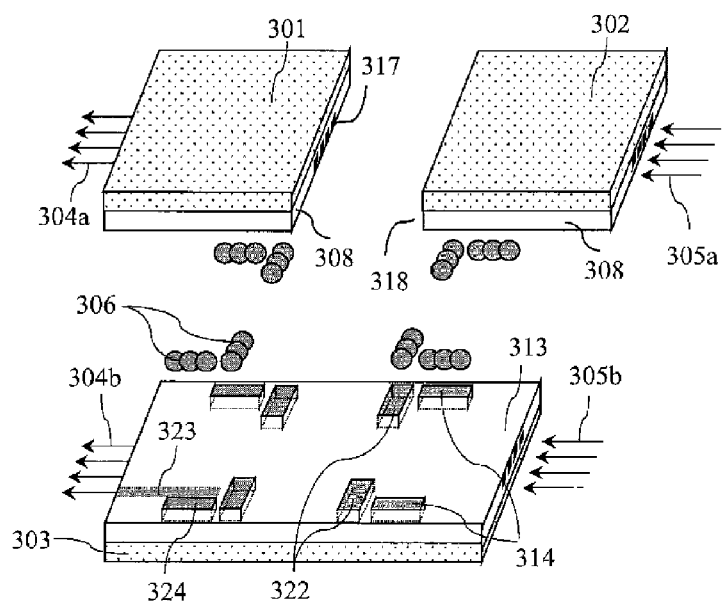
FIG. 3B is a schematic diagram showing the connection structure for optical waveguide chips according to the third embodiment of the present invention.
Figure 3C:
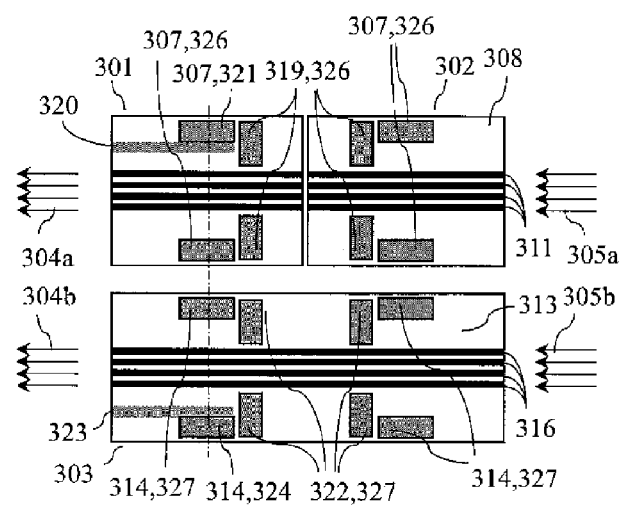
FIG. 3C is a schematic diagram showing the connection structure for optical waveguide chips according to the third embodiment of the present invention.
Figure 3D:
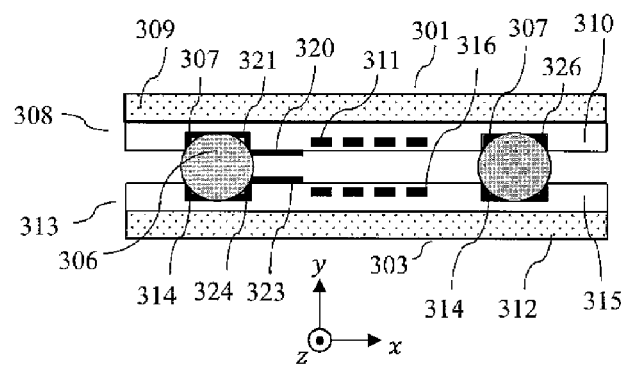
FIG. 3D is a schematic diagram showing the connection structure for optical waveguide chips according to the third embodiment of the present invention.

FIGS. 3A to 3D are schematic diagrams showing a connection structure for optical waveguide chips according to a third embodiment of the present invention. FIG. 3A is a perspective view of the connection structure for the optical waveguide chips, FIG. 3B is an exploded view of components of the connection structure, FIG. 3C is a diagram showing bonding faces of the optical waveguide chips, and FIG. 3D is a cross-sectional view of the connection structure taken along an xy plane.

As shown in FIG. 3A, an input optical signal 305a incident on a silica-based PLC 302 propagates through an optical waveguide layer of the silica-based PLC 302, exits the silica-based PLC 302, is incident on a silica-based PLC 301, propagates through an optical waveguide layer of the silica-based PLC 301 and then exits as an output optical signal 304a from the silica-based PLC 301. An input optical signal 305b incident on a silica-based PLC 303 propagates through an optical waveguide layer of the silica-based PLC 303 and exits the silica-based PLC 303 as an output optical signal 304b.

As with the silica-based PLC 101, the silica-based PLC 301 includes a support substrate 309 made of Si and an optical waveguide layer 308 for transmitting an input optical signal formed on the support substrate 309. As with the optical waveguide layer 108, the optical waveguide layer 308 includes a cladding layer 310 and a core 311. In the cladding layer 310, fitting grooves 307 and 319 similar to the fitting grooves 107 and 119 are formed. The silica-based PLC 302 has the same structure as the silica-based PLC 301.

FIG. 3C shows bonding faces of the optical waveguide layers 308 (cladding layers 310) of the silica-based PLCs 301 and 302 that are to be bonded to the silica-based PLC 303, and a bonding face of the optical waveguide layer (cladding layer) of the silica-based PLC 303 that is to be bonded to the silica-based PLCs 301 and 302.

In the cladding layer 310 of the silica-based PLC 301, a conductor wire 320 similar to the conductor wire 120 is formed. On an inner face of the fitting groove 307 of the two fitting grooves 307 of the silica-based PLC 301 that is closer to the conductor wire 320, a conductor film 321 is formed, and the conductor film 321 is electrically connected to the conductor wire 320.

In this embodiment, in addition to the conductor film 321 formed in the fitting groove 307 of the silica-based PLC 301 that is in the vicinity of the conductor wire 320, a conductor film 326 is formed on an inner face of each of the other fitting grooves 307 and 319. The conductor films 326 can be formed at the same time as the conductor film 321.

Similarly, conductor films 326 are also formed on inner faces of all the fitting grooves 307 and 319 of the silica-based PLC 302.

On the other hand, as with the silica-based PLC 103, the silica-based PLC 303 includes a support substrate 312 made of Si and an optical waveguide layer 313 for transmitting the input optical signal 305b formed on the support substrate 312. As with the optical waveguide layer 113, the optical waveguide layer 313 includes a cladding layer 315 and a core 316. In the cladding layer 315, fitting grooves 314 similar to the fitting grooves 114 and fitting grooves 322 similar to the fitting grooves 122 are formed.

Furthermore, in the cladding layer 315 of the silica-based PLC 303, a conductor wire 323 similar to the conductor wire 123 is formed. On an inner face of the fitting groove 314 of the four fitting grooves 314 of the silica-based PLC 303 that is in the vicinity of the conductor wire 323, a conductor film 324 is formed, and the conductor film 324 is electrically connected to the conductor wire 323. As in the first embodiment, of the four fitting grooves 314, the fitting groove 314 in which the conductor film 324 is formed is the fitting groove 314 located to be opposed to the fitting groove 307 of the silica-based PLC 301 with the conductor film 321 formed therein when the silica-based PLC 301 is mounted on the silica-based PLC 303.

In this embodiment, in addition to the conductor film 324 formed in the fitting groove 314 of the silica-based PLC 303 that is in the vicinity of the conductor wire 323, a conductor film 327 is formed on an inner face of each of the other fitting grooves 314 and 322. The conductor films 327 can be formed at the same time as the conductor film 324.

The PPCP according to this embodiment is fabricated by fitting a spacer steel ball 306 (spacer member) having the same diameter in each of the four fitting grooves 314 and the four fitting grooves 322 formed in the silica-based PLC 303. In this embodiment, three spacer steel balls 306 are fitted in each of the fitting grooves 314 and 322.

As shown in FIG. 3B, with the bonding face of the optical waveguide layer 308 (cladding layer 310) of the silica-based PLC 301 being opposed to the bonding face of the optical waveguide layer 313 (cladding layer 315) of the silica-based PLC 303, the silica-based PLC 301 is mounted on the silica-based PLC 303 by fitting the spacer steel balls 306 fitted in the two fitting grooves 314 of the silica-based PLC 303 into the two fitting grooves 307 of the silica-based PLC 301 and the spacer steel balls 306 fitted in the two fitting grooves 322 of the silica-based PLC 303 into the two fitting grooves 319 of the silica-based PLC 301.

Similarly, with the bonding face of the optical waveguide layer 308 of the silica-based PLC 302 being opposed to the bonding face of the optical waveguide layer 313 of the silica-based PLC 303, the silica-based PLC 302 is mounted on the silica-based PLC 303 by fitting the spacer steel balls 306 fitted in the two fitting grooves 314 of the silica-based PLC 303 into the two fitting grooves 307 of the silica-based PLC 302 and the spacer steel balls 306 fitted in the two fitting grooves 322 of the silica-based PLC 303 into the two fitting grooves 319 of the silica-based PLC 302.

In this way, as in the first embodiment, the silica-based PLCs 301 and 302 can be mounted on the silica-based PLC 303 in such a manner that an entrance and exit end face 317 of the silica-based PLC 301 and an entrance and exit end face 318 of the silica-based PLC 302 are opposed to each other at a close distance, and an optical connection between the silica-based PLC 301 and the silica-based PLC 302 can be established.

Furthermore, in this embodiment, the conductor film 321 formed in the fitting groove 307 of the silica-based PLC 301 and the conductor film 324 formed in the fitting groove 314 of the silica-based PLC 303 are electrically connected to each other by the spacer steel ball 306 fitted in the fitting grooves 307 and 314. As a result, in this embodiment, the conductor wire 320 of the silica-based PLC 301 and the conductor wire 323 of the silica-based PLC 303 can be electrically connected to each other.

As in the first embodiment, the conductor films 321, 324, 326 and 327 can be formed in exactly or substantially the same fabrication process as the conductor wires 320 and 323, and any three-dimensional structure such as a metal spring does not have to be formed. As for the spacer steel balls 306, precise and inexpensive steel balls for ball bearings or ball point pens are available. Thus, the implementation cost can be reduced.

In the first embodiment, the conductor film 121 is formed in only one of the two fitting grooves 107 of the silica-based PLC 101 that is in the vicinity of the conductor wire 120, and the conductor film 124 is formed in only one of the four fitting grooves 114 of the silica-based PLC 103 that is opposed to the fitting groove 107 with the conductor film 121 formed therein. Therefore, the depth of the fitting groove 107 with the conductor film 121 formed therein differs from the depth of the other fitting grooves 107 and 119 of the silica-based PLC 101 by the thickness of the conductor film 121, and the depth of the fitting groove 114 with the conductor film 124 formed therein differs from the depth of the other fitting grooves 114 and 122 of the silica-based PLC 103 by the thickness of the conductor film 124. As a result, the silica-based PLC 101 may be slightly inclined with respect to the silica-based PLC 103.

On the other hand, in this embodiment, the conductor films 321, 324, 326 and 327 having the same thickness are formed in all the fitting grooves 307, 314, 319 and 322 of the silica-based PLCs 301 to 303, and all the fitting grooves 307, 314, 319 and 322 have the same depth. Therefore, the possibility that the silica-based PLC 301 is inclined with respect to the silica-based PLC 303 can be reduced compared with the first embodiment, and alignments can be achieved with higher precision.

Fourth Embodiment

Figure 4A:
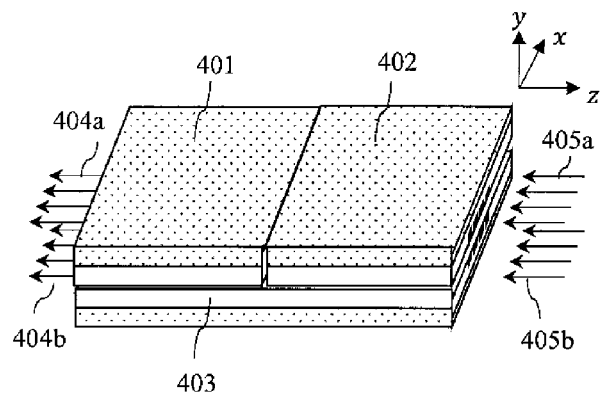
FIG. 4A is a schematic diagram showing a connection structure for optical waveguide chips according to a fourth embodiment of the present invention.
Figure 4B:
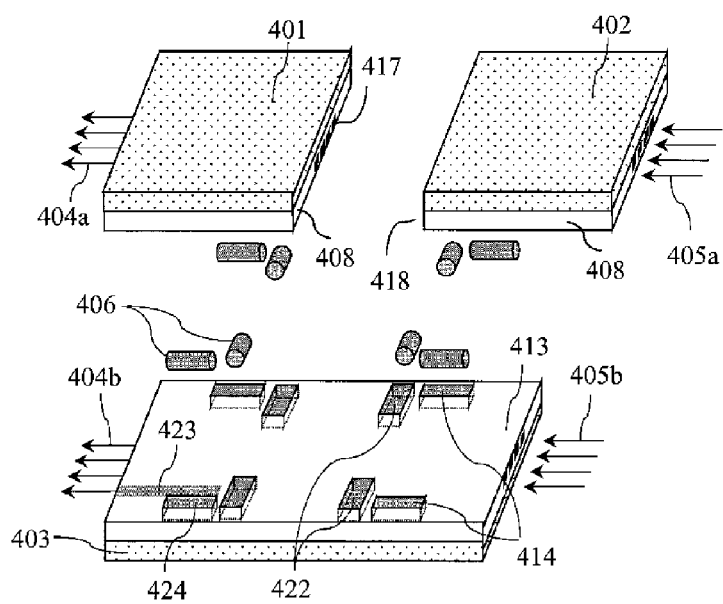
FIG. 4B is a schematic diagram showing the connection structure for optical waveguide chips according to the fourth embodiment of the present invention.
Figure 4C:
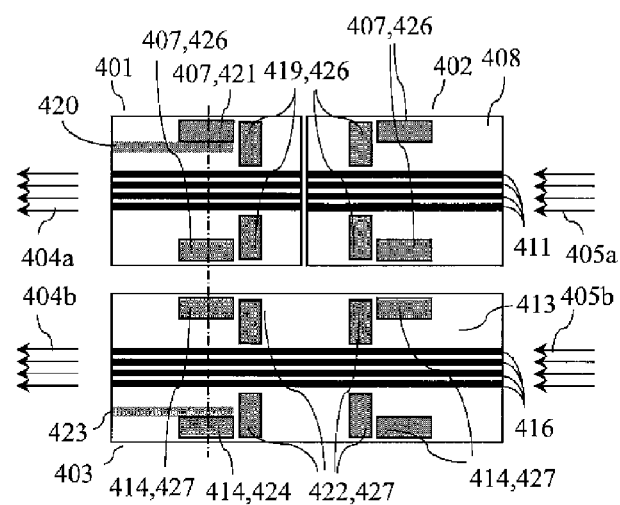
FIG. 4C is a schematic diagram showing the connection structure for optical waveguide chips according to the fourth embodiment of the present invention.
Figure 4D:
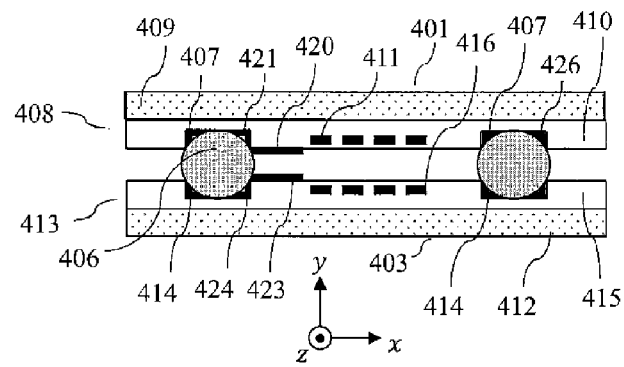
FIG. 4D is a schematic diagram showing the connection structure for optical waveguide chips according to the fourth embodiment of the present invention.

FIGS. 4A to 4D are schematic diagrams showing a connection structure for optical waveguide chips according to a fourth embodiment of the present invention. FIG. 4A is a perspective view of the connection structure for the optical waveguide chips, FIG. 4B is an exploded view of components of the connection structure, FIG. 4C is a diagram showing bonding faces of the optical waveguide chips, and FIG. 4D is a cross-sectional view of the connection structure taken along an xy plane.

As shown in FIG. 4A, an input optical signal 405*a* incident on a silica-based PLC 402 propagates through an optical waveguide layer of the silica-based PLC 402, exits the silica-based PLC 402, is incident on a silica-based PLC 401, propagates through an optical waveguide layer of the silica-based PLC 401 and then exits as an output optical signal 404*a* from the silica-based PLC 401. An input optical signal 405*b* incident on a silica-based PLC 403 propagates through an optical waveguide layer of the silica-based PLC 403 and exits the silica-based PLC 403 as an output optical signal 404*b*.

As with the silica-based PLC 101, the silica-based PLC 401 includes a support substrate 409 made of Si and an optical waveguide layer 408 for transmitting an input optical signal formed on the support substrate 409. As with the optical waveguide layer 108, the optical waveguide layer 408 includes a cladding layer 410 and a core 411. In the cladding layer 410, fitting grooves 407 and 419 similar to the fitting grooves 107 and 119 are formed. The silica-based PLC 402 has the same structure as the silica-based PLC 401.

FIG. 4C shows bonding faces of the optical waveguide layers 408 (cladding layers 410) of the silica-based PLCs 401 and 402 that are to be bonded to the silica-based PLC 403, and a bonding face of the optical waveguide layer (cladding layer) of the silica-based PLC 403 that is to be bonded to the silica-based PLCs 401 and 402.

In the cladding layer 410 of the silica-based PLC 401, a conductor wire 420 similar to the conductor wire 120 is formed. On an inner face of the fitting groove 407 of the two fitting grooves 407 of the silica-based PLC 401 that is closer to the conductor wire 420, a conductor film 421 is formed, and the conductor film 421 is electrically connected to the conductor wire 420.

In this embodiment, in addition to the conductor film 421 formed in the fitting groove 407 of the silica-based PLC 401 that is in the vicinity of the conductor wire 420, a conductor film 426 is formed on an inner face of each of the other fitting grooves 407 and 419. The conductor films 426 can be formed at the same time as the conductor film 421.

Similarly, conductor films 426 are also formed on inner faces of all the fitting grooves 407 and 419 of the silica-based PLC 402.

On the other hand, as with the silica-based PLC 103, the silica-based PLC 403 includes a support substrate 412 made of Si and an optical waveguide layer 413 for transmitting the input optical signal 405b formed on the support substrate 412. As with the optical waveguide layer 113, the optical waveguide layer 413 includes a cladding layer 415 and a core 416. In the cladding layer 415, fitting grooves 414 similar to the fitting grooves 114 and fitting grooves 422 similar to the fitting grooves 122 are formed.

Furthermore, in the cladding layer 415 of the silica-based PLC 403, a conductor wire 423 similar to the conductor wire 123 is formed. On an inner face of the fitting groove 414 of the four fitting grooves 414 of the silica-based PLC 403 that is in the vicinity of the conductor wire 423, a conductor film 424 is formed, and the conductor film 424 is electrically connected to the conductor wire 423. As in the first embodiment, of the four fitting grooves 414, the fitting groove 414 in which the conductor film 424 is formed is the fitting groove 414 located to be opposed to the fitting groove 407 of the silica-based PLC 401 with the conductor film 421 formed therein when the silica-based PLC 401 is mounted on the silica-based PLC 403.

In this embodiment, in addition to the conductor film 424 formed in the fitting groove 414 of the silica-based PLC 403 that is in the vicinity of the conductor wire 423, a conductor film 427 is formed on an inner face of each of the other fitting grooves 414 and 422. The conductor films 427 can be formed at the same time as the conductor film 424.

The PPCP according to this embodiment is fabricated by fitting a spacer optical fiber 406 (spacer member) having the same diameter in each of the four fitting grooves 414 and the four fitting grooves 422 formed in the silica-based PLC 403. All the spacer optical fibers 406 are coated with a conductor film.

As shown in FIG. 4B, with the bonding face of the optical waveguide layer 408 (cladding layer 410) of the silica-based PLC 401 being opposed to the bonding face of the optical waveguide layer 413 (cladding layer 415) of the silica-based PLC 403, the silica-based PLC 401 is mounted on the silica-based PLC 403 by fitting the spacer optical fibers 406 fitted in the two fitting grooves 414 of the silica-based PLC 403 into the two fitting grooves 407 of the silica-based PLC 401 and the spacer optical fibers 406 fitted in the two fitting grooves 422 of the silica-based PLC 403 into the two fitting grooves 419 of the silica-based PLC 401.

Similarly, with the bonding face of the optical waveguide layer 408 of the silica-based PLC 402 being opposed to the bonding face of the optical waveguide layer 413 of the silica-based PLC 403, the silica-based PLC 402 is mounted on the silica-based PLC 403 by fitting the spacer optical fibers 406 fitted in the two fitting grooves 414 of the silica-based PLC 403 into the two fitting grooves 407 of the silica-based PLC 402 and the spacer optical fibers 406 fitted in the two fitting grooves 422 of the silica-based PLC 403 into the two fitting grooves 419 of the silica-based PLC 402.

In this way, as in the first embodiment, the silica-based PLCs 401 and 402 can be mounted on the silica-based PLC 403 in such a manner that an entrance and exit end face 417 of the silica-based PLC 401 and an entrance and exit end face 418 of the silica-based PLC 402 are opposed to each other at a close distance, and an optical connection between the silica-based PLC 401 and the silica-based PLC 402 can be established.

Furthermore, in this embodiment, the conductor film 421 formed in the fitting groove 407 of the silica-based PLC 401 and the conductor film 424 formed in the fitting groove 414 of the silica-based PLC 403 are electrically connected to each other by the spacer optical fiber 406 fitted in the fitting grooves 407 and 414. As a result, in this embodiment, the conductor wire 420 of the silica-based PLC 401 and the conductor wire 423 of the silica-based PLC 403 can be electrically connected to each other.

As in the first embodiment, the conductor films 421, 424, 426 and 427 can be formed in exactly or substantially the same fabrication process as the conductor wires 420 and 423, and any three-dimensional structure such as a metal spring does not have to be formed. As for the spacer optical fibers 406 coated with a conductor film, inexpensive optical fibers are available. Thus, the implementation cost can be reduced.

In the second embodiment, the conductor film 221 is formed in only one of the two fitting grooves 207 of the silica-based PLC 201 that is in the vicinity of the conductor wire 220, and the conductor film 224 is formed in only one of the four fitting grooves 214 of the silica-based PLC 203 that is opposed to the fitting groove 207 with the conductor film 221 formed therein. In addition, of the eight spacer optical fibers 206 and 225, only one spacer optical fiber 225 is coated with a conductor film. Therefore, the depth of the fitting groove 207 with the conductor film 221 formed therein differs from the depth of the other fitting grooves 207 and 219 of the silica-based PLC 201 by the thickness of the conductor film 221, the depth of the fitting groove 214 with the conductor film 224 formed therein differs from the depth of the other fitting grooves 214 and 222 of the silica-based PLC 203 by the thickness of the conductor film 224, and the diameter of the spacer optical fiber 225 differs from the other spacer optical fibers 206 by the thickness of the conductor film. As a result, the silica-based PLC 201 may be slightly inclined with respect to the silica-based PLC 203.

On the other hand, in this embodiment, the conductor films 421, 424, 426 and 427 having the same thickness are formed in all the fitting grooves 407, 414, 419 and 422 of the silica-based PLCs 401 to 403, and all the spacer optical fibers 406 are coated with a conductor film. Therefore, all the fitting grooves 407, 414, 419 and 422 have the same depth, and all the spacer optical fibers 406 have the same diameter. Therefore, the possibility that the silica-based PLC 401 is inclined with respect to the silica-based PLC 403 can be reduced compared with the second embodiment, and alignments can be achieved with higher precision.

Fifth Embodiment

Figure 5:
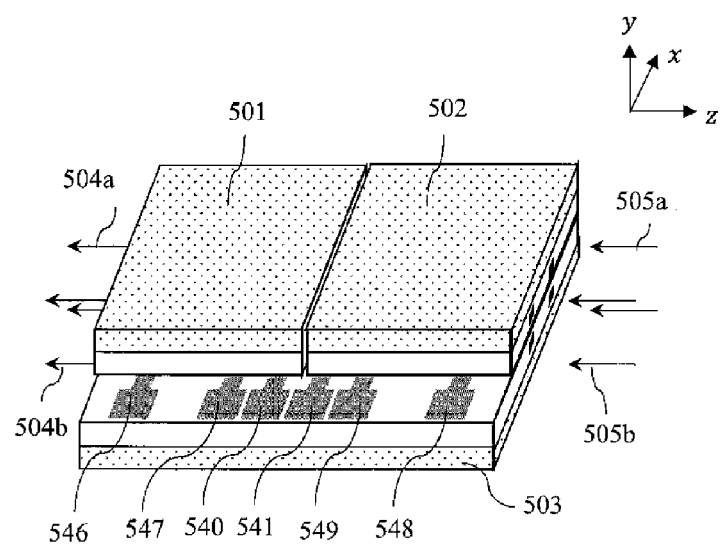
FIG. 5 is a perspective view of a connection structure for optical waveguide chips according to a fifth embodiment of the present invention.
Figure 6:
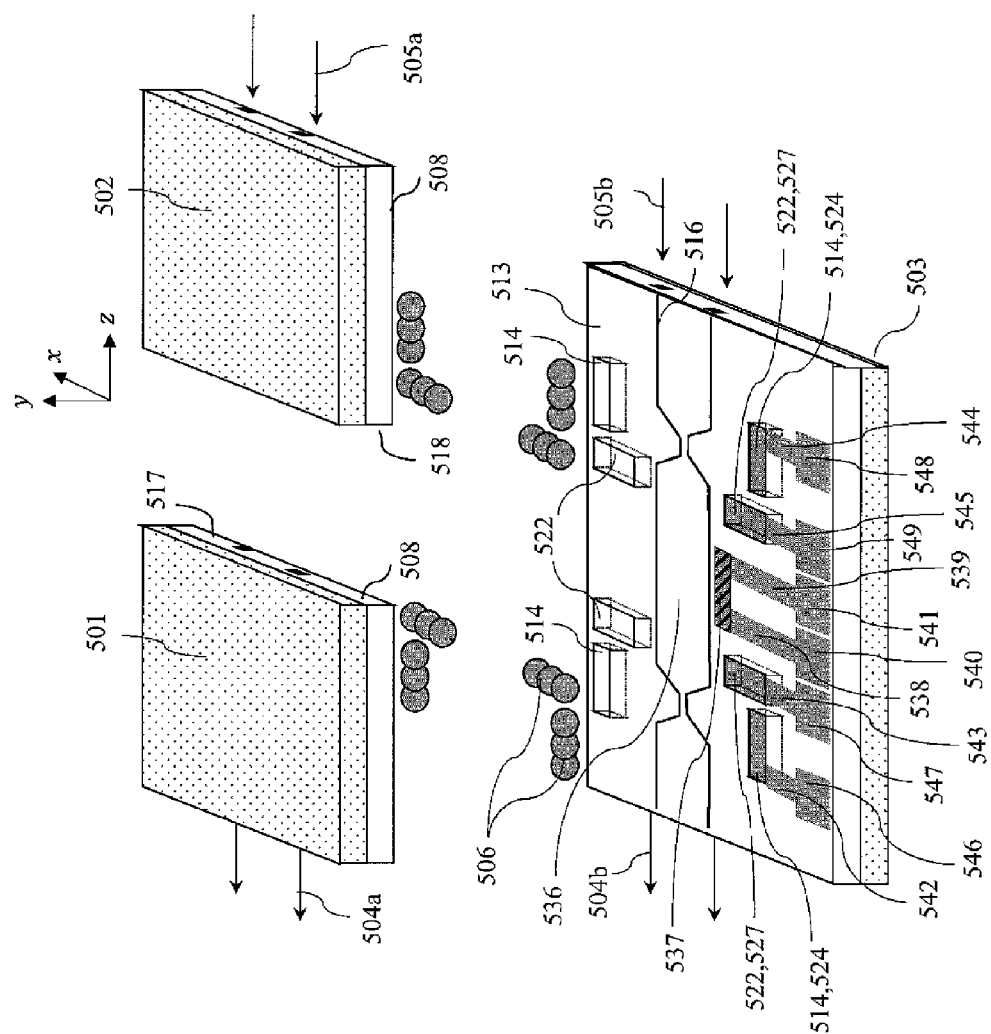
FIG. 6 is an exploded view of components of the connection structure for optical waveguide chips according to the fifth embodiment of the present invention.
Figure 7:
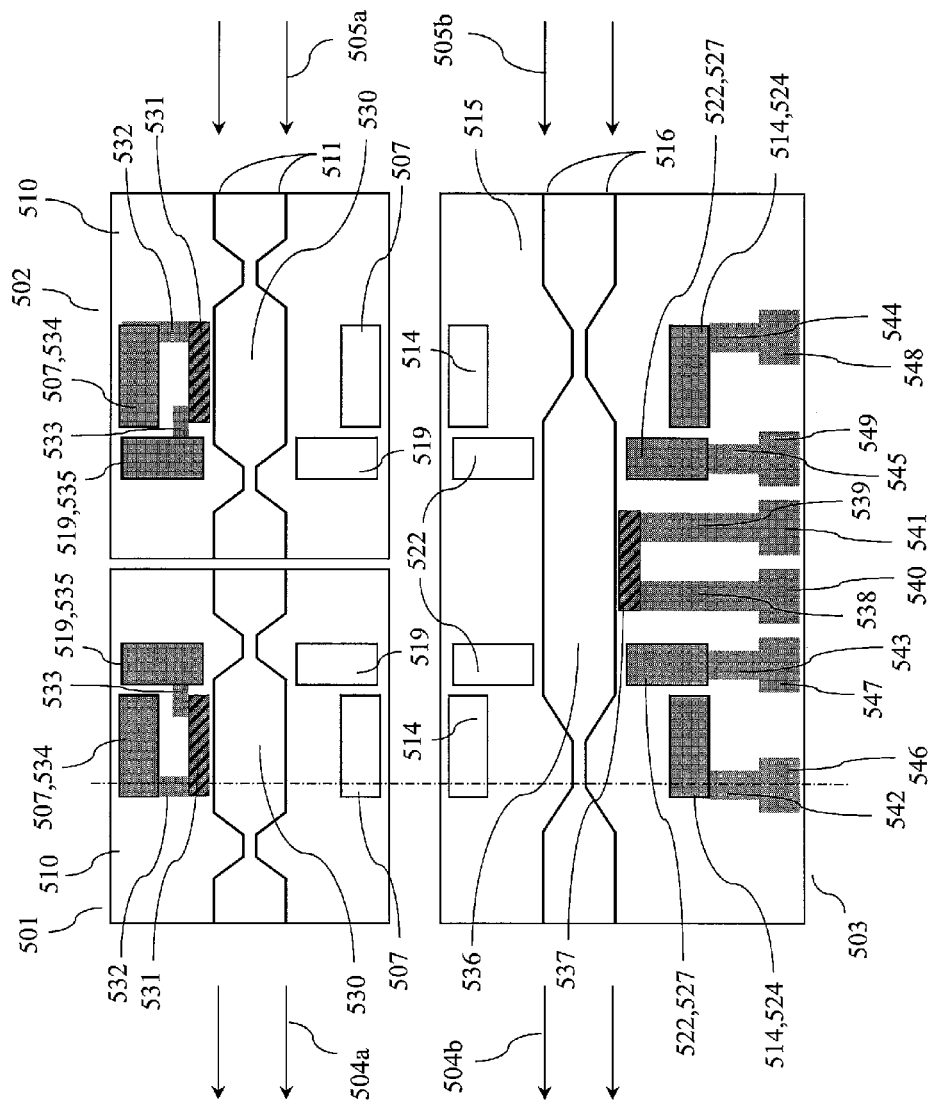
FIG. 7 is a diagram showing bonding faces of the optical waveguide chips according to the fifth embodiment of the present invention.
Figure 8:
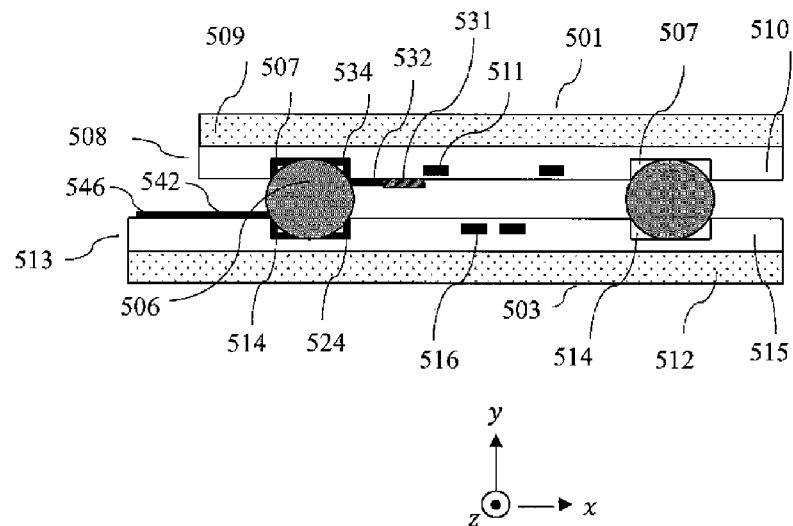
FIG. 8 is a cross-sectional view of the connection structure for optical waveguide chips according to the fifth embodiment of the present invention.
Figure 9A:
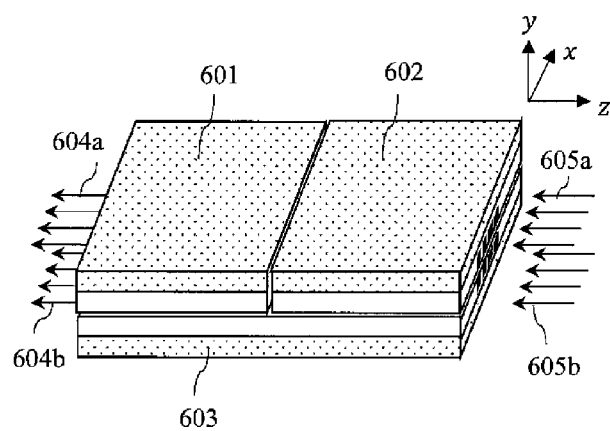
FIG. 9A is a schematic diagram showing a conventional connection structure for optical waveguide chips.
Figure 9B:
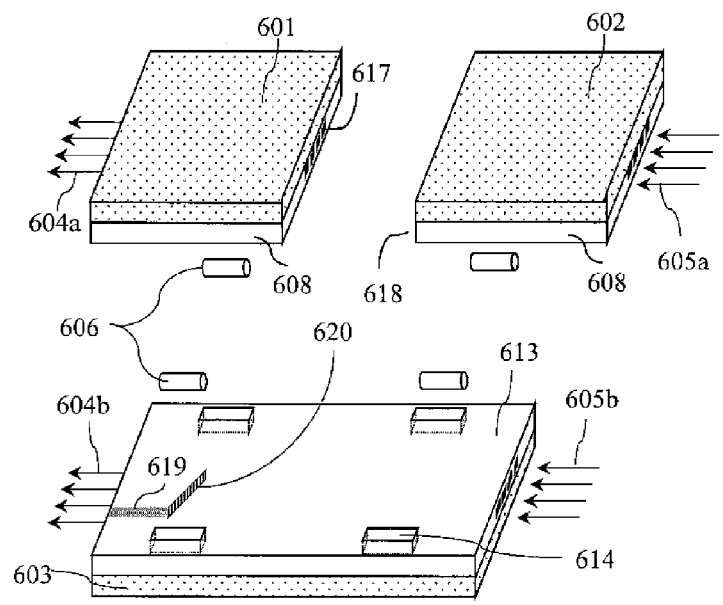
FIG. 9B is a schematic diagram showing the conventional connection structure for optical waveguide chips.
Figure 9C:
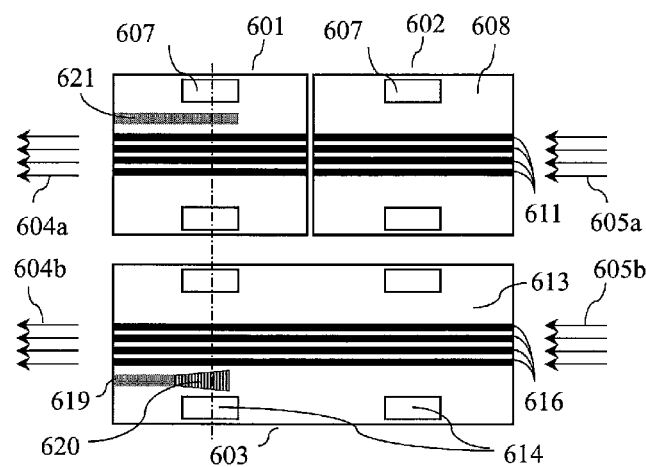
FIG. 9C is a schematic diagram showing the conventional connection structure for optical waveguide chips.
Figure 9D:
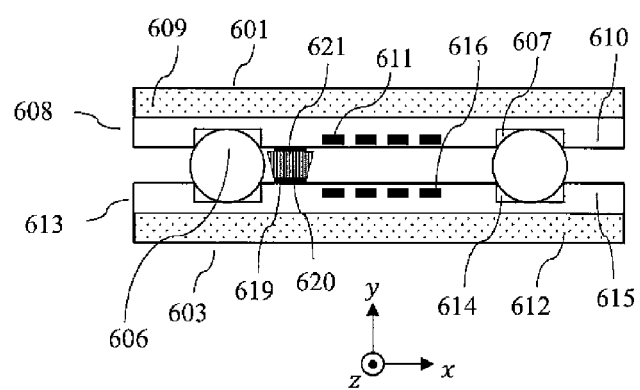
FIG. 9D is a schematic diagram showing the conventional connection structure for optical waveguide chips.

FIGS. 5 to 8 are schematic diagrams showing a connection structure for optical waveguide chips according to a fifth embodiment of the present invention. FIG. 5 is a perspective view of the connection structure for the optical waveguide chips, FIG. 6 is an exploded view of components of the connection structure, FIG. 7 is a diagram showing bonding faces of the optical waveguide chips, and FIG. 8 is a cross-sectional view of the connection structure taken along an xy plane.

As shown in FIG. 5, an input optical signal 505a incident on a silica-based PLC 502 propagates through an optical waveguide layer of the silica-based PLC 502, exits the silica-based PLC 502, is incident on a silica-based PLC 501, propagates through an optical waveguide layer of the silica-based PLC 501 and then exits as an output optical signal 504*a* from the silica-based PLC 501. An input optical signal 505*b* incident on a silica-based PLC 503 propagates through an optical waveguide layer of the silica-based PLC 503 and exits the silica-based PLC 503 as an output optical signal 504*b*.

As with the silica-based PLC 101, the silica-based PLC 501 includes a support substrate 509 made of Si and an optical waveguide layer 508 for transmitting an input optical signal formed on the support substrate 509. As with the optical waveguide layer 108, the optical waveguide layer 508 includes a cladding layer 510 and a core 511. In the cladding layer 510, fitting grooves 507 and 519 similar to the fitting grooves 107 and 119 are formed.

FIG. 7 shows bonding faces of the optical waveguide layers 508 (cladding layers 510) of the silica-based PLCs 501 and 502 that are to be bonded to the silica-based PLC 503, and a bonding face of the optical waveguide layer (cladding layer) of the silica-based PLC 503 that is to be bonded to the silica-based PLCs 501 and 502.

In the silica-based PLC 501, a Mach-Zehnder modulator 530 is formed. The Mach-Zehnder modulator 530 includes two cores 511 forming two arm waveguides, a heater 531 formed in the cladding layer 510 in the vicinity of one of the two arm waveguides, and conductor wires 532 and 533 that are formed in the cladding layer 510 and electrically connected to the heater 531 at one end thereof.

On an inner face of the fitting groove 507 of the two fitting grooves 507 of the silica-based PLC 501 that is closer to the conductor wire 532, a conductor film 534 is formed, and the conductor film 534 is electrically connected to the conductor wire 532. On an inner face of the fitting groove 519 of the two fitting grooves 519 of the silica-based PLC 501 that is closer to the conductor wire 533, a conductor film 535 is formed, and the conductor film 535 is electrically connected to the conductor wire 533. The conductor films 534 and 535 may be formed at the same time as the conductor wires 532 and 533 (that is, the conductor films 534 and 535 may have the same film structure as the conductor wires 532 and 533). Alternatively, the conductor films 534 and 535 may be formed to cover the inner faces of the fitting grooves 507 and 519 and parts of the conductor wires 532 and 533 in the vicinities of the fitting grooves 507 and 519, respectively, after the conductor wires 532 and 533 are formed. The silica-based PLC 502 have the same structure as the silica-based PLC 501.

On the other hand, as with the silica-based PLC 103, the silica-based PLC 503 includes a support substrate 512 made of Si and an optical waveguide layer 513 for transmitting the input optical signal 505*b* formed on the support substrate 512. As with the optical waveguide layer 113, the optical waveguide layer 513 includes a cladding layer 515 and a core 516. In the cladding layer 515, fitting grooves 514 similar to the fitting grooves 114 and fitting grooves 522 similar to the fitting grooves 122 are formed.

In the silica-based PLC 503, a Mach-Zehnder modulator 536 is formed. The Mach-Zehnder modulator 536 includes two cores 516 forming two arm waveguides, a heater 537 formed in the cladding layer 515 in the vicinity of one of the two arm waveguides, and conductor wires 538 and 539 that are formed in the cladding layer 515 and electrically connected to the heater 537 at one end thereof. The conductor wires 538 and 539 are electrically connected to pads 540 and 541 formed on the cladding layer 515, respectively, at the other end thereof.

Furthermore, in the cladding layer 515 of the silica-based PLC 503, conductor wires 542, 543, 544 and 545 are formed. The conductor wires 542, 543, 544 and 545 are electrically connected to pads 546, 547, 548 and 549 formed on the cladding layer 515, respectively, at one end thereof.

On inner faces of the two fitting grooves 514 of the four fitting grooves 514 of the silica-based PLC 503, a conductor film 524 is formed, and the conductor films 524 are electrically connected to the other ends of the conductor wires 542 and 544, respectively. The fitting grooves 514 of the four fitting grooves 514 in which the conductor film 524 is formed are the two fitting grooves 514 located to be opposed to the fitting grooves 507 of the silica-based PLCs 501 and 502 with the conductor film 534 formed therein when the silica-based PLCs 501 and 502 are mounted on the silica-based PLC 503.

Similarly, on inner faces of the two fitting grooves 522 of the four fitting grooves 522 of the silica-based PLC 503, a conductor film 527 is formed, and the conductor films 527 are electrically connected to the other ends of the conductor wires 543 and 545, respectively. The fitting grooves 522 of the four fitting grooves 522 in which the conductor film 527 is formed are the two fitting grooves 522 located to be opposed to the fitting grooves 519 of the silica-based PLCs 501 and 502 with the conductor film 535 formed therein when the silica-based PLCs 501 and 502 are mounted on the silica-based PLC 503.

The conductor films 524 and 527 may be formed at the same time as the conductor wires 538, 539 and 542 to 545 and the pads 540, 541 and 546 to 549 (that is, the conductor films 524 and 527 may have the same film structure as the conductor wires 538, 539 and 542 to 545 and the pads 540, 541 and 546 to 549). Alternatively, the conductor films 524 and 527 may be formed to cover the inner faces of the fitting grooves 514 and 522 and parts of the conductor wires 542 to 545 in the vicinities of the fitting grooves 514 and 522 after the conductor wires 538, 539 and 542 to 545 and the pads 540, 541 and 546 to 549 are formed.

The PPCP according to this embodiment is fabricated by fitting a spacer steel ball 506 (spacer member) having the same diameter in the four fitting grooves 514 and the four fitting grooves 522 formed in the silica-based PLC 503. In this embodiment, three spacer steel balls 506 are fitted in each of the fitting grooves 514 and 522.

As shown in FIG. 6, with the bonding face of the optical waveguide layer 508 (cladding layer 510) of the silica-based PLC 501 being opposed to the bonding face of the optical waveguide layer 513 (cladding layer 515) of the silica-based PLC 503, the silica-based PLC 501 is mounted on the silica-based PLC 503 by fitting the spacer steel balls 506 fitted in the two fitting grooves 514 of the silica-based PLC 503 into the two fitting grooves 507 of the silica-based PLC 501 and the spacer steel balls 506 fitted in the two fitting grooves 522 of the silica-based PLC 503 into the two fitting grooves 519 of the silica-based PLC 501.

Similarly, with the bonding face of the optical waveguide layer 508 of the silica-based PLC 502 being opposed to the bonding face of the optical waveguide layer 513 of the silica-based PLC 503, the silica-based PLC 502 is mounted on the silica-based PLC 503 by fitting the spacer steel balls 506 fitted in the two fitting grooves 514 of the silica-based PLC 503 into the two fitting grooves 507 of the silica-based PLC 502 and the spacer steel balls 506 fitted in the two fitting grooves 522 of the silica-based PLC 503 into the two fitting grooves 519 of the silica-based PLC 502.

In this way, as in the first embodiment, the silica-based PLCs 501 and 502 can be mounted on the silica-based PLC 503 in such a manner that an entrance and exit end face 517 of the silica-based PLC 501 and an entrance and exit end face 518 of the silica-based PLC 502 are opposed to each other at a close distance, and an optical connection between the silica-based PLC 501 and the silica-based PLC 502 can be established.

Furthermore, in this embodiment, the conductor films 534 formed in the fitting grooves 507 of the silica-based PLCs 501 and 502 and the conductor films 524 formed in the fitting grooves 514 of the silica-based PLC 503 are electrically connected to each other by the spacer steel balls 506 fitted in the fitting grooves 507 and 514. Similarly, the conductor films 535 formed in the fitting grooves 519 of the silica-based PLCs 501 and 502 and the conductor films 527 formed in the fitting grooves 522 of the silica-based PLC 503 are electrically connected to each other by the spacer steel balls 506 fitted in the fitting grooves 519 and 522.

As a result, in this embodiment, the pads 546 and 547 formed on the silica-based PLC 503 and the heater 531 of the Mach-Zehnder modulator 530 of the silica-based PLC 501 can be electrically connected to each other, and the light incident on the Mach-Zehnder modulator 530 of the silica-based PLC 501 can be modulated by energizing the heater 531 through the pads 546 and 547. Similarly, the pads 548 and 549 formed on the silica-based PLC 503 and the heater 531 of the Mach-Zehnder modulator 530 of the silica-based PLC 502 can be electrically connected to each other, and the light incident on the Mach-Zehnder modulator 530 of the silica-based PLC 502 can be modulated by energizing the heater 531 through the pads 548 and 549.

Of course, the light incident on the Mach-Zehnder modulator 536 of the silica-based PLC 503 can also be modulated by energizing the heater 537 through the pads 540 and 541 formed on the silica-based PLC 503.

As in the first embodiment, the conductor films 524, 527, 534 and 535 can be formed in exactly or substantially the same fabrication process as the conductor wires 532, 533, 538, 539 and 542 to 545 and the pads 540, 541 and 546 to 549, and any three-dimensional structure such as a metal spring does not have to be formed. As for the spacer steel balls 306, precise and inexpensive steel balls for ball bearings or ball point pens are available. Thus, the implementation cost can be reduced.

In general, with devices including a plurality of PLCs, pads are often unable to be formed on some PLCs because of physical or structural restrictions. However, according to the embodiments, a pad formed on a particular PLC can be electrically connected to an element on another PLC, and at the same time, the implementation cost can be improved without compromising the advantages of the PPCP technology.

According to embodiments of the present invention, the way in which the input optical signal is input to the PPCP or the way in which the output signal light is output from the PPCP is not particularly limited. The input optical signal can be input in any way. For example, the input optical signal may be input through a spatial optical system or through an optical fiber via optical fiber block bonding. Alternatively, the PLC may have no optical signal input end face, and the input optical signal may be input from a light emitting element or modulator element such as a laser diode arranged on or in the PLC. The output signal light can be output in any way. For example, the output signal light may be output through a spatial optical system or through an optical fiber via optical fiber block bonding. Alternatively, the PLC may have no optical signal output end face, and the output signal light may be output to a light receiving element such as a photodiode arranged on or in the PLC.

According to embodiments of the present invention, the optical circuits of the PLCs forming the PPCP are not particularly limited. Although the optical circuit shown with regard to the first to fifth embodiments have only simple straight optical waveguides or Mach-Zehnder modulators, these two types of optical circuits are given only for illustrative purposes and are not the only possible examples. That is, the PPCP technology and embodiments of the present invention are independent from each other in terms of type or configuration of the optical circuits or electrical circuits.

Although the spacer optical fiber or spacer steel ball is used as a member for bonding PLCs in the first to fifth embodiments, any spacer member made of any material having any shape other than the spacer optical fiber or spacer steel ball can be used as far as the spacer member can be appropriately fitted in the grooves. Specifically, the spacer member may be made of any material, such as glass, metal, ceramic or polymer. The spacer member may have any shape other than the cylindrical shape or spherical shape, such as a truncated cone, a polygonal column or an elliptical sphere. However, when a spacer member made of an insulating material is used instead of the spacer steel ball or the spacer optical fiber coated with a conductor film, the spacer member needs to be coated with a conductor film.

The basic material of the PLC can be arbitrarily chosen as far as the first to fifth embodiments can be implemented. In the silica-based PLC, which is currently popular, the support substrate is a Si substrate, and the cladding layer is a cladding layer made of SiO2, and these materials are one of optimal basic materials for embodiments of the present invention. However, any other PLC can be used, such as a PLC having a waveguide structure made of a dielectric material such as TaO2/SiO2 or lithium niobate or a waveguide structure made of a compound semiconductor-based material, or a silicon photonics material-based PLC.

In the first to fifth embodiments, the height of the spacer member is preferably greater than the sum of the depths of the upper and lower fitting grooves in which the spacer member is fitted.

Although the silica-based PLCs 101 and 102, 201 and 202, 301 and 302, 401 and 402 or 501 and 502 are mounted on the silica-based PLCs 103, 203, 303, 403 or 503 in the first to fifth embodiments, a base substrate having no waveguide may be used instead of the lower silica-based PLCs 103, 203, 303, 403 or 503. Such a base substrate is fabricated in the same manner as the silica-based PLCs 103, 203, 303, 403 or 503, except that the cores 116, 216, 316, 416 or 516, the heater 537, the conductor wires 538 and 539, the pads 540 and 541 and other components in the silica-based PLCs 103, 203, 303, 403 or 503 are omitted.

INDUSTRIAL APPLICABILITY

Embodiments of the present invention can be applied to a technique of connecting optical waveguide chips to each other.

REFERENCE SIGNS LIST 101-103, 201-203, 301-303, 401-403, 501-503 silica-based PLC
104a, 104b, 204a, 204b, 304a, 304b, 404a, 404b, 504a, 504b output optical signal
105a, 105b, 205a, 205b, 305a, 305b, 405a, 405b, 505a, 505b input optical signal 106, 306, 506 spacer steel ball
107, 114, 119, 122, 207, 214, 219, 222, 307, 314, 319, 322, 407, 414, 419, 422, 507, 514, 519, 522 fitting groove
108, 113, 208, 213, 308, 313, 408, 413, 508, 513 optical waveguide layer
109, 112, 209, 212, 309, 312, 409, 412, 509, 512 support substrate
110, 115, 210, 215, 310, 315, 410, 415, 510, 515 cladding layer
111, 116, 211, 216, 311, 316, 411, 416, 511, 516 core
120, 123, 220, 223, 320, 323, 420, 423, 532, 533, 538, 539, 542, 543, 544, 545 conductor wire
121, 124, 221, 224, 321, 324, 326, 327, 421, 424, 426, 427, 524, 527, 534, 535 conductor film
206, 225, 406 spacer optical fiber
530, 536 Mach-Zehnder modulator
531, 537 heater
540, 541, 546-549 pad

The invention claimed is:

1. A connection structure for optical waveguide chips, the connection structure comprising:
a base substrate having a plurality of first grooves therein;
a plurality of spacer members fitted in the plurality of first grooves, respectively, wherein a part of each spacer member protrudes from the base substrate;
a plurality of optical waveguide chips each comprising a substrate and an optical waveguide layer on the substrate, a plurality of second grooves in the optical waveguide layer at locations opposed to the plurality of first grooves, wherein the protruding part of each spacer member is fitted into a respective one of the plurality of second grooves, wherein the plurality of optical waveguide chips are mounted on the base substrate and supported by the plurality of spacer members, and wherein the plurality of optical waveguide chips are mounted on the base substrate such that entrance and exit end faces of the optical waveguide layers of two adjacent optical waveguide chips of the plurality of optical waveguide chips are opposed to each other;
a first conductor wire in the base substrate; and
a second conductor wire in at least one optical waveguide chip of the plurality of optical waveguide chips, wherein the first conductor wire and the second conductor wire are electrically connected to each other by at least one spacer member of the plurality of spacer members having a conductivity.

2. The connection structure according to claim 1, wherein the base substrate further includes a first conductor film electrically connected to the first conductor wire on an inner face of at least one of the plurality of first grooves into which the at least one spacer member having the conductivity is fitted.

3. The connection structure according to claim 2, wherein the at least one optical waveguide chip further includes a second conductor film electrically connected to the second conductor wire on an inner face of the second groove that is opposed to the at least one of the plurality of first grooves having the first conductor film.

4. The connection structure according to claim 3, wherein the first conductor film is in all of the plurality of first grooves, and the second conductor film is in all of the plurality of second grooves.

5. The connection structure according to claim 3, wherein the first conductor wire and the first conductor film have a same film structure, and the second conductor wire and the second conductor film have a same film structure.

6. The connection structure according to claim 1, wherein an entirety of the at least one spacer member having the conductivity comprises a conductor.

7. The connection structure according to claim 1, wherein a surface of the at least one spacer member having the conductivity comprises a conductor.

8. The connection structure according to claim 1, wherein all of the plurality of spacer members have the conductivity and have a same structure.

9. A connection structure for optical waveguide chips, the connection structure comprising:
a first optical waveguide chip comprising a first substrate, a first optical waveguide layer on the first substrate, and a plurality of first grooves in the first optical waveguide layer;
a plurality of spacer members fitted in the plurality of first grooves, respectively, such that a part of each of the plurality of spacer members protrudes from the first optical waveguide chip;
a second optical waveguide chip comprising a second substrate, a second optical waveguide layer on the second substrate, and a plurality of second grooves in the second optical waveguide layer at locations opposite the plurality of first grooves, wherein the protruding part of each spacer member is fitted into a respective one of the plurality of second grooves, wherein the second optical waveguide chip is mounted on the first optical waveguide chip and supported by the plurality of spacer members;
a first conductor wire in the first optical waveguide chip; and
a second conductor wire in the second optical waveguide chip, wherein the first conductor wire and the second conductor wire are electrically connected to each other by at least one spacer member of the plurality of spacer members having a conductivity.

10. The connection structure according to claim 9, wherein:
the first optical waveguide chip further includes a first conductor film electrically connected to the first conductor wire on an inner face of at least one of the plurality of first grooves into which the at least one spacer member having the conductivity is fitted; and
the second optical waveguide chip further includes a second conductor film electrically connected to the second conductor wire on an inner face of the second groove that is opposite the at least one of the plurality of first grooves having the first conductor film.

11. The connection structure according to claim 10, wherein the first conductor film is in all of the plurality of first grooves, and the second conductor film is in all of the plurality of second grooves.

12. The connection structure according to claim 10, wherein the first conductor wire and the first conductor film have a same film structure, and the second conductor wire and the second conductor film have a same film structure.

13. The connection structure according to claim 9, wherein an entirety of the at least one spacer member having the conductivity comprises a conductor.

14. The connection structure according to claim 9, wherein a surface of the at least one spacer member having the conductivity comprises a conductor.

15. The connection structure according to claim 9, wherein all of the plurality of spacer members have the conductivity and have a same structure.

16. A method of forming a connection structure for optical waveguide chips, the method comprising:

providing a first optical waveguide chip comprising a first substrate and a first optical waveguide layer on the first substrate;

forming a plurality of first grooves in the first optical waveguide layer;

fitting a plurality of spacer members in the plurality of first grooves, respectively, such that a part of each of the plurality of spacer members protrudes from the first optical waveguide chip;

providing a second optical waveguide chip comprising a second substrate and a second optical waveguide layer on the second substrate;

forming a plurality of second grooves in the second optical waveguide layer at locations opposite the plurality of first grooves;

mounting the second optical waveguide chip on the first optical waveguide chip by fitting the protruding part of each spacer member into a respective one of the plurality of second grooves;

forming a first conductor wire in the first optical waveguide chip; and forming a second conductor wire in the second optical waveguide chip, wherein the first conductor wire and the second conductor wire are electrically connected to each other by at least one spacer member of the plurality of spacer members having a conductivity.

17. The method according to claim 16, wherein:

the first optical waveguide chip further includes a first conductor film electrically connected to the first conductor wire on an inner face of at least one of the plurality of first grooves into which the at least one spacer member having the conductivity is fitted; and the second optical waveguide chip further includes a second conductor film electrically connected to the second conductor wire on an inner face of the second groove that is opposite the at least one of the plurality of first grooves having the first conductor film.

18. The method according to claim 17, wherein the first conductor film is formed in all of the plurality of first grooves, and the second conductor film is formed in all of the plurality of second grooves.

19. The method according to claim 17, wherein the first conductor wire and the first conductor film have a same film structure, and the second conductor wire and the second conductor film have a same film structure.

20. The method according to claim 16, wherein an entirety of the at least one spacer member having the conductivity comprises a conductor, or wherein a surface of the at least one spacer member having the conductivity comprises a conductor.

* * * * *